United States Patent
Smith et al.

(10) Patent No.: US 11,677,848 B2
(45) Date of Patent: Jun. 13, 2023

(54) SUBSCRIPTION MANAGEMENT AND WEB-BASED ACTIVITY TRACKING IN A COMPUTING ENVIRONMENT

(71) Applicant: Pushnami LLC, Austin, TX (US)

(72) Inventors: Emerson Smith, Austin, TX (US); Mitchell Taylor, Austin, TX (US)

(73) Assignee: Pushnami LLC, Austin, TX (US)

( * ) Notice: Subject to any disclaimer, the term of this patent is extended or adjusted under 35 U.S.C. 154(b) by 0 days.

(21) Appl. No.: 17/404,549

(22) Filed: Aug. 17, 2021

(65) Prior Publication Data

US 2022/0060551 A1    Feb. 24, 2022

Related U.S. Application Data (60) Provisional application No. 63/068,178, filed on Aug. 20, 2020.

(51) Int. Cl.
    *H04L 67/50* (2022.01)
(52) U.S. Cl.
    CPC .................................. *H04L 67/535* (2022.05)
(58) Field of Classification Search
    None
    See application file for complete search history.

(56) References Cited

U.S. PATENT DOCUMENTS

| | | | |
|---|---|---|---|
| 9,407,698 B1* | 8/2016 | Latif | H04L 65/403 |
| 2007/0011253 A1* | 1/2007 | Taylor | H04L 51/28 |
| | | | 709/206 |
| 2014/0046772 A1* | 2/2014 | Raman | G06Q 30/0255 |
| | | | 705/14.66 |
| 2015/0143262 A1* | 5/2015 | Norwood | H04L 51/046 |
| | | | 715/753 |
| 2015/0262199 A1 | 9/2015 | Taylor et al. | |
| 2016/0323231 A1 | 11/2016 | Lee et al. | |
| 2018/0041567 A1* | 2/2018 | Kidambi | H04L 67/06 |
| 2019/0130445 A1* | 5/2019 | Trainor | G06Q 30/0261 |
| 2020/0128086 A1 | 4/2020 | Lewis et al. | |

OTHER PUBLICATIONS

PCT Notification of Transmittal of the International Search Report and the Written Opinion of the International Searching Authority for PCT Application No. PCT/US2021/46290, dated Nov. 23, 2021, 16 pages.

* cited by examiner

*Primary Examiner* — James A Edwards
(74) *Attorney, Agent, or Firm* — Sprinkle IP Law Group (57) ABSTRACT

A subscriber management system and method are described, according to various implementations. In an implementation, the method and system generates a unique user device identifier that is stored and accessed in storage on a user device. The user device identifier is passed in network requests when visiting a website having an installation of a module of the subscriber management system.

20 Claims, 9 Drawing Sheets

SUBSCRIPTION MANAGEMENT AND WEB-BASED ACTIVITY TRACKING IN A COMPUTING ENVIRONMENT

CROSS-REFERENCE TO RELATED APPLICATION

This application claims the benefit of U.S. Provisional Patent Application No. 63/068,178, filed Aug. 20, 2020, the entire disclosure of which is incorporated herein by reference.

TECHNICAL FIELD

The present disclosure relates to information communication networks, and more particularly, to subscription management and web-based activity tracking in a computing environment.

BACKGROUND

Conventionally, end user devices and associated online activities (e.g., website navigation and communications) have been tracked using two primary approaches. The first conventional approach involves the use of sets or "cookies" stored on a web browser of a user device that are used to identify the user device by detecting the placement of the code set or cookie. The second conventional approach involves a user login wherein a user provides identifying information (e.g., a username and password) to enable the identification of the user during web-based activities.

However, many web browsers (e.g., Mozilla Firefox, Google Chrome, etc.) are eliminating the use and support of cookies. Furthermore, the user login model requiring the execution of active measures by each user (e.g., establishing an account, setting a username and password, etc.) is disfavored as inefficient in many instances and obtrusive to the user. In this regard, the user login model serves as a barrier to the ability to effectively track user activity and identify users.

BRIEF DESCRIPTION OF THE FIGURES

The present disclosure will be understood more fully from the detailed description given below and from the accompanying drawings of various implementations of the disclosure.

DETAILED DESCRIPTION

Aspects of the present application relate to a method and system to manage subscriptions and track web-based user device activity relating to one or more content provider systems, according to various implementations. The method and system (herein referred to as the "subscriber management system") is configured to generate and track subscription information associated with a user device and a content provider system (e.g., an entity managing, owning, operating and provisioning one or more websites). In an embodiment, a content provider system (also referred to as an "account" or "account system") can be associated with one or more websites (e.g., the one or more websites are owned and/or operated by the account system). Each website of the multiple account systems in the computing environment is associated with the subscriber management system. In an embodiment, the websites represent a live domain or installation associated with the subscriber management system configured to perform activities and operations of the subscriber management system.

In an embodiment, in response to a user device accessing a website (e.g., visiting the website using a web browser of the user device) associated with a content provider system or account system, the subscriber management system generates a unique user device identifier (UUID) (also referred to as "user device identifier" or "user device identifier data") to store in association with the user device and the content provider system (or account). In an embodiment, a subscription can include a single messaging subscription which is generated when a user device enables or allows notification permissions on a website. In an embodiment, the user device identifier that is generated can be coupled with subscriber registration details to enable registration with one or more services of the subscriber management system. Example subscriber registration details can include, but are not limited to, a subscription endpoint, one or more encryption keys required for notification delivery, a subscription expiration time, etc.). In an embodiment, the registration details allow a push messaging system to send and deliver notifications to a push subscription. For example, an HTTP request can be triggered for the subscription endpoint to send a notification. In an embodiment, this request can additionally include the encryption keys from the push subscription along with a notification payload (e.g., title, message, link, etc.) which may be used for notification delivery. According to embodiments, the unique user device identifier and subscriber registration details are stored on the associated user device, in a cross-origin data storage system and storage of the subscription management subscriber management system.

As described in greater detail below, in an embodiment, in response to the same user device navigating to or visiting a website associated with the same content provider system, a component of the subscriber management system (e.g., a script or other executable program) operating via the website identifies the associated user device identifier (e.g., the identifier associated with the subscription of the user device to a website associated with the content provider system). The identified or retrieved user device identifier is used to identify the user device and track the user device activities associated with the content provider system.

Advantageously, the content provider system can employ the subscriber management system to perform user device activity tracking in a cookie-free computing environment. Furthermore, the subscriber management system can store the user device subscription data in storage of the subscriber management system, the user device, and a storage system or domain (e.g., a cross-origin storage system) that is accessible by multiple different content provider systems to enable those systems to identify a stored user device identifier associated with a user device. In an embodiment, the storage system represents a "hub" or common domain that stores the subscription data and enables a user device to access data in the storage system from a separate domain (e.g., website).

In an implementation, the content recommendation system may include one or more software components (e.g., a set of instructions residing in a memory) executable by one or more processing devices to perform the operations and functions relating to the management of subscriptions and the tracking of web-based user device activities relating to one or more content provider systems, as described herein in greater detail with reference to FIGS. 1-7.

Figure 1:
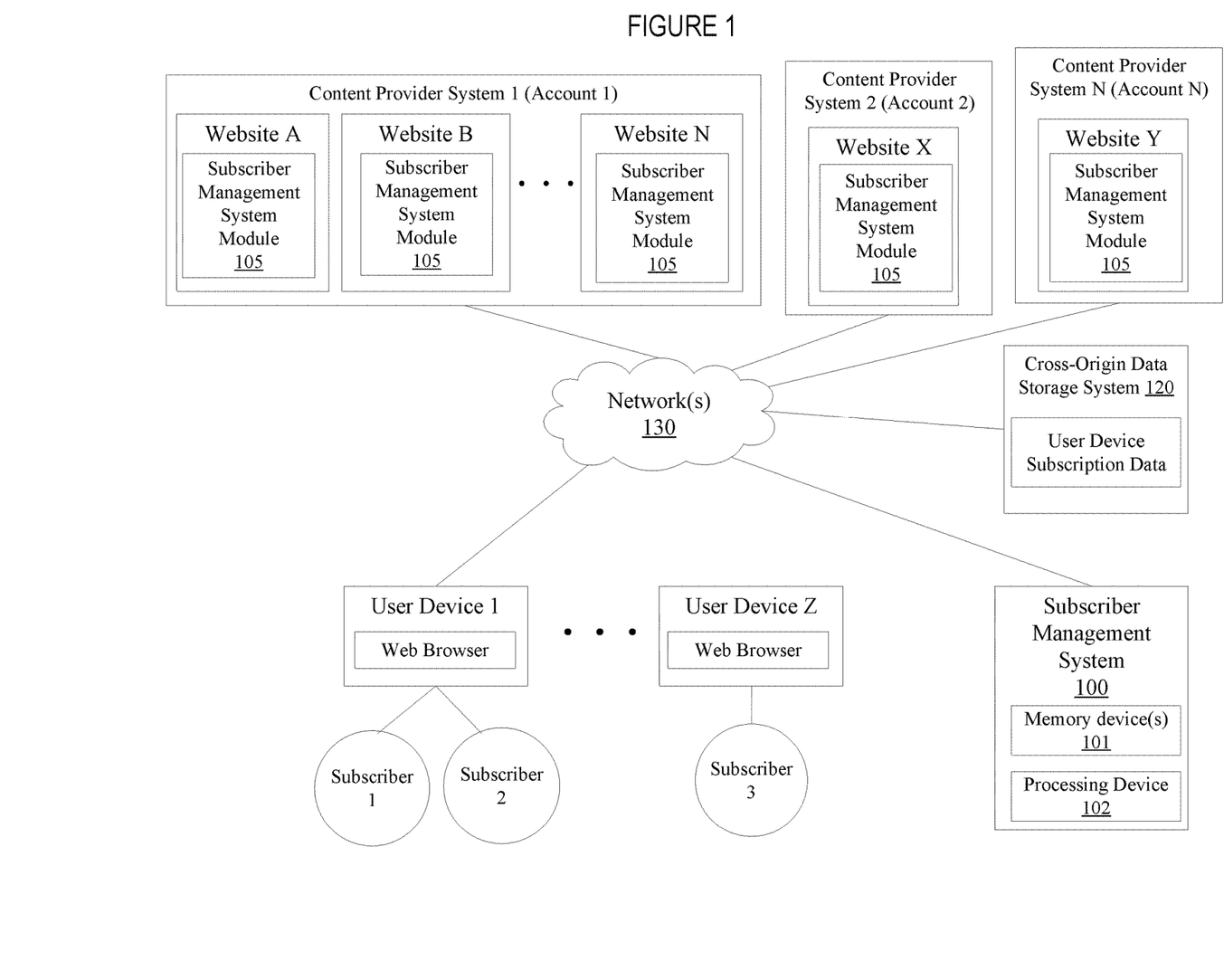
FIG. 1 illustrates an example system architecture including a subscriber management system, in accordance with one or more embodiments of the present disclosure.

FIG. 1 illustrates an example computing environment including a subscriber management system 100 according to embodiments of the present disclosure. In an embodiment the subscriber management system 100 includes a subscriber management system module 105 associated with each of the websites (e.g., Website A, Website B . . . Website N, Website X, Website Y, etc.) associated with multiple different content provider systems (e.g., content provider system 1, content provider system 2 . . . content provider system N). As noted, each of the content provider systems are also referred to as "Accounts" as it relates to the subscriber management system 100. In an embodiment, each of the content provider systems establishes an account with the subscriber management system 100 and each of the one or more websites owned or managed by the respective content provider systems is linked or associated with the account and configured to execute the subscriber management system module 105 to enable communications and interactions with the subscriber management system 100. In an embodiment, the subscriber management system 105 is a program or script which executes on a website and is configured to generate and track a user device identifier that identifies one or more subscribers (e.g., Subscriber 1, Subscriber 2, Subscriber 3 of FIG. 1) corresponding to a user device (e.g., User Device 1 . . . User Device Z of FIG. 1). In an embodiment, multiple different subscribers can use the same user device (e.g., subscriber 1 and Subscriber 2 both utilize User Device 1, as shown in FIG. 1).

The subscriber management system 100 can include one or more computing devices (e.g., servers) to provide the subscription management services described in detail herein to the content provider systems. The subscriber management system 100 and components thereof can be software components (e.g., one or more sets of instructions residing in a memory 101) executable by one or more processing devices 102 to perform the subscription management services described herein. In an embodiment, the subscriber management system 100 includes the subscriber management system module 105 that is installed on each website of the content provider systems (e.g., installed and stored in a memory associated with the website as a script that is executable by one or more processing devices associated with the website). The memory device(s) 101 of the subscriber management system 100 and the memory associated with the respective websites can include any suitable computer readable storage medium, such as volatile memory devices (e.g., random access memory (RAM), non-volatile memory devices (e.g., flash memory), a magnetic hard disk, a Universal Serial Bus (USB) solid state drive, a local disk, an external disk, and/or other types of memory devices).

In an embodiment, the subscriber management system 100 is associated with a storage system (e.g., cross-origin data storage system 120) configured to store user device subscription data generated and managed by the subscriber management system 100. In an embodiment, the cross-origin data storage system 120 implements a method of storing and retrieving data on a client device (i.e., user device). In an embodiment, a localStorage application programming interface (API) of the web browser of the user device can be used. Example localStorage APIs include, but are not limited to the localStorage API provided by Mozilla, described in greater detail at developer.mozilla.org/en-US/docs/Web/API/Window/localStorage.

In an embodiment, the cross-origin data storage system 120 serves as a centralized data store or "hub", which is a common domain where data can be stored and enables a "client" (i.e., user device) to access data in the "hub" from a separate domain (i.e., a website as shown in FIG. 1). In an embodiment, the subscription data storage and retrieval is an extension of localStorage and enables access to storage on the "hub" domain from external website domains. An example cross-origin data storage system 120 and corresponding utilities employed by the subscriber management system 100 include, but are not limited to, the Zendesk cross-origin data storage utility (as described in greater detail at https://github.com/zendesk/cross-storage).

In an embodiment, the computing environment includes one or more networks 130 to enable communicative coupling between the various computing systems (e.g., the user devices, content provider systems, subscriber management system 100, the cross-origin data storage system 120, etc.). The one or more networks 130 can include one or more local area networks (LAN), one or more wireless networks, one or more mobile communications networks, one or more wide area networks (WAN), such as the Internet, or similar communication systems, or combinations of such. The one or more networks 130 can include one or more networking and/or computing devices such as wired and wireless devices. In an embodiment, the networks 130 can include multiple different and separate networks.

In an embodiment, the user devices (e.g., user device 1 . . . user device Z) can be a computing device include a web-accessible interface (e.g., a web browser), such as a server computer, a desktop computer, a set-top box, a gaming console, a television, a portable computing device such as, and not limited to, mobile telephones, personal digital assistants (PDAs), portable media players, netbooks, laptop computers, an electronic book reader, wearable electronic devices and the like. For example, a user device may be a laptop computer, a tablet computer, a desktop computer, or a smartphone.

As illustrated in FIG. 1, in an embodiment, each account (e.g., a content provider system) can own or be associated with one or more websites. As illustrated in FIG. 1, in an embodiment, each website is owned or associated with a single account. As illustrated in FIG. 1, in an embodiment, each website can be associated with one or more subscribers, wherein each subscriber is owned or associated with a single website. As illustrated in FIG. 1, in an embodiment, each subscriber (e.g., Subscriber 1) is associated with a single user de (e.g., User Device 1), wherein each user device (e.g., User Device 1) can be associated with multiple subscribers (e.g., Subscriber 1 and Subscriber 2). As illustrated in FIG. 1, in an embodiment, each account can be associated with multiple different user devices. Furthermore, in an embodiment, each user device can be associated with multiple different accounts.

In an embodiment, the subscription management system, including the subscription management system modules associated with the respective websites of the multiple different accounts, is configured to execute various steps, functions, and operations relating to the subscription management processing described herein in connection with FIGS. 2-6.

Figure 2:
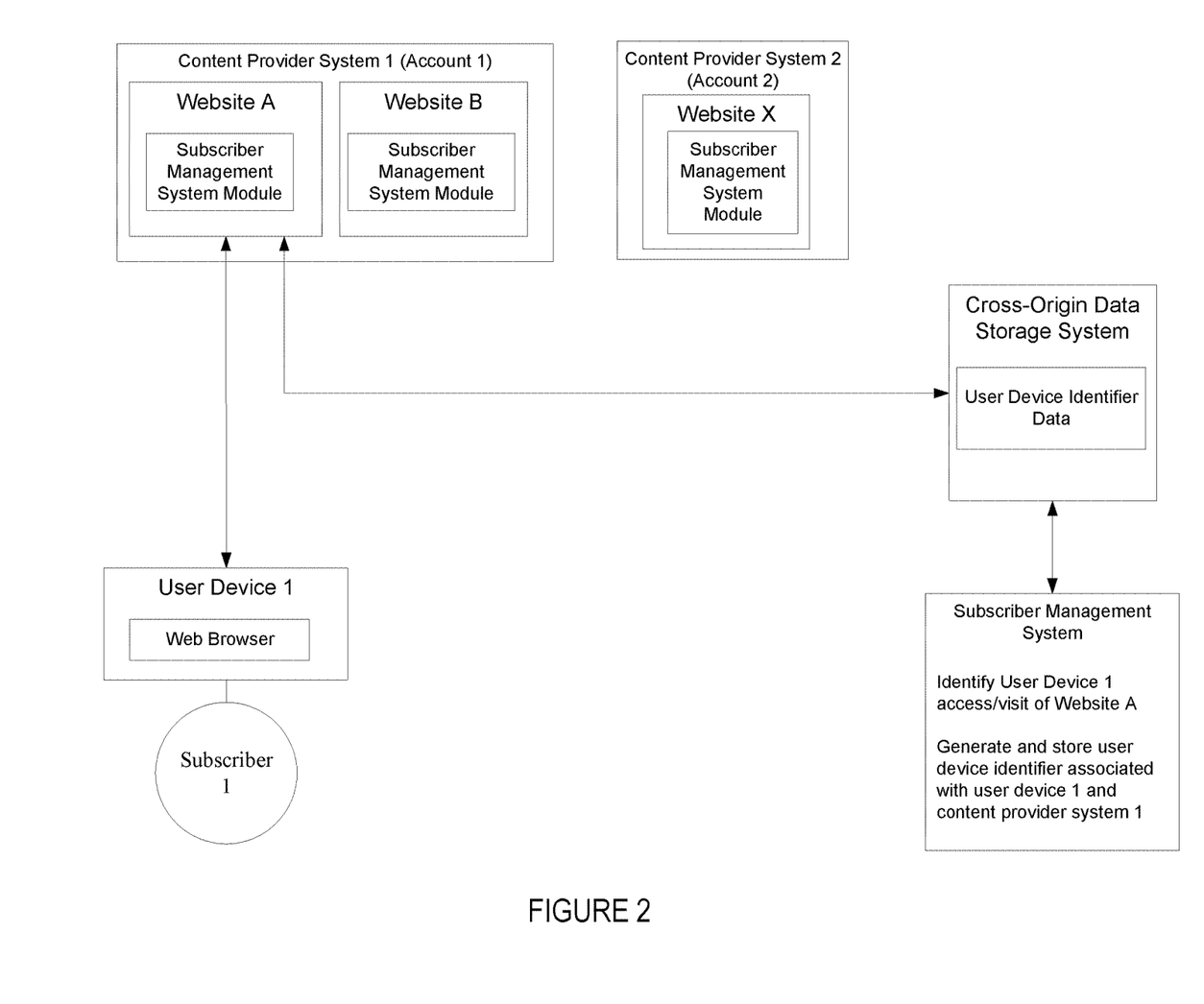
FIG. 2 illustrates example operations of a subscription management process executed by the subscriber management system including generating and storing a user device identifier in response to identifying access by a user device to a website associated with a content provider system, according to one or more embodiments of the present disclosure.

FIG. 2 illustrates example operations of a subscription management process executed by the subscriber management system, according to embodiments. As shown in FIG. 2, User Device 1 accesses or visits website A owned or associated with content provider system 1 (account 1). As shown, Website A includes the subscriber management system module (e.g., an installed executable script such as subscriber management system module 105 of FIG. 1) configured to identify or detect the access by user device 1 and determine if User Device 1 is associated with a user device identifier. In the example shown in FIG. 2, the subscriber management system module determines that user device 1 is not subscribed (e.g., has not previously visited Website A) and generates a unique user device identification value (e.g., a user device identifier that is uniquely associated with User Device 1). In an embodiment, the user device identifier generated by the subscriber management system module is a unique identifier (e.g., an alphanumeric string or other data structure having a unique value) representing the association or subscription of User Device 1 (and corresponding one or more subscribers) and the account (e.g., account 1). In an embodiment, the subscriber management system module provides the generated user device identifier (e.g., user device identifier 1) to the cross-origin data storage system for storage as part of the user device subscription data.

Figure 3:
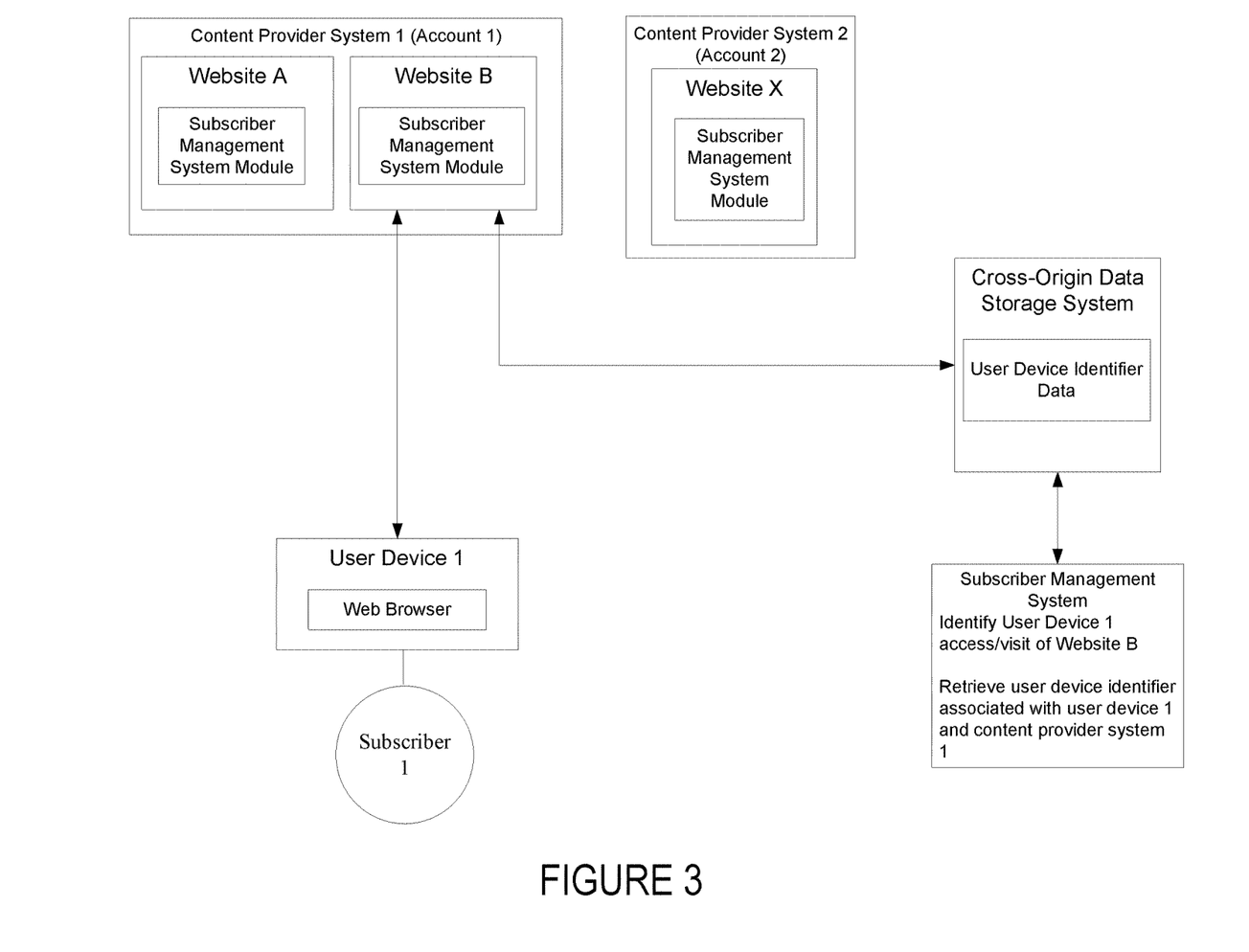
FIG. 3 illustrates example operations of a subscription management process executed by the subscriber management system including tracking web-based activity of a user device in view of a user device identifier, according to one or more embodiments of the present disclosure.

FIG. 3 illustrates example operations of a subscription management process executed by the subscriber management system, according to embodiments. As shown in FIG. 3, following the operations shown in FIG. 2 (e.g., at a second time following access by User Device 1 to Website A), User Device 1 visits website B which, along with Website A, is owned or associated with content provider system 1 (account 1). In this embodiment, the subscriber management system module communicates with the cross-origin data storage system to determine whether User Device 1 is associated with a user device identifier corresponding to content provider system 1. In this example, the subscriber management system module identifies and retrieves user device identifier 1 from the user device subscription data stored in the cross-origin data storage system. In an embodiment, the retrieved user device identifier (e.g., user device identifier 1) is associated with and tracks user device 1's visit to website B. In an embodiment, the access and navigational activity of user device 1 with respect to website B is tracked (e.g., monitored and recorded) by associating the activity with the retrieved (e.g., previously generated and stored) unique user device identifier (e.g., user device identifier 1) associated with User Device 1. In an embodiment, the user device identifier is stored on the user device, the cross-origin storage system and storage associated with the subscription management system.

Figure 4:
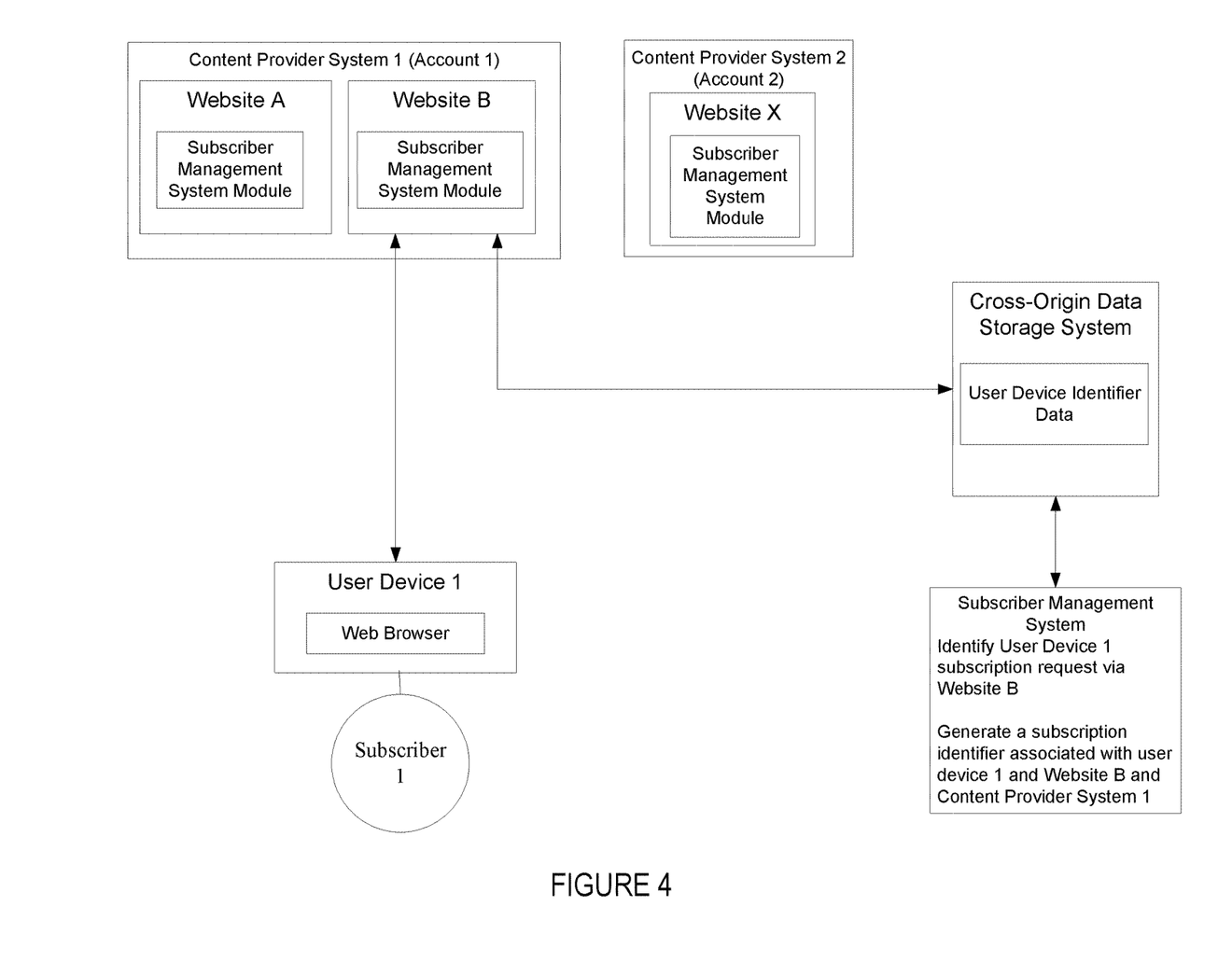
FIG. 4 illustrates example operations of a subscription management process executed by the subscriber management system including generating a subscription identifier associated with a subscription to a website by a user device, according to one or more embodiments of the present disclosure.

FIG. 4 illustrates example operations of a subscription management process executed by the subscriber management system, according to embodiments. As shown in FIG. 4, the subscriber management system processes a subscribing activity of Subscriber 1 of user device 1 relating to website B (e.g., Subscriber 1 subscribes to website B). In this embodiment, the subscriber management system collects subscription or registration details (e.g., in response to an opt-in or subscription prompt) associated with the user device and/or subscriber (i.e., registration details). In this embodiment, the subscriber management system generates a value associated with the registration details. In an embodiment, the registration details and user device identifier are provided to and stored by the subscriber management system as a subscription identifier for registration with the one or more services of the subscriber management system.

Figure 5:
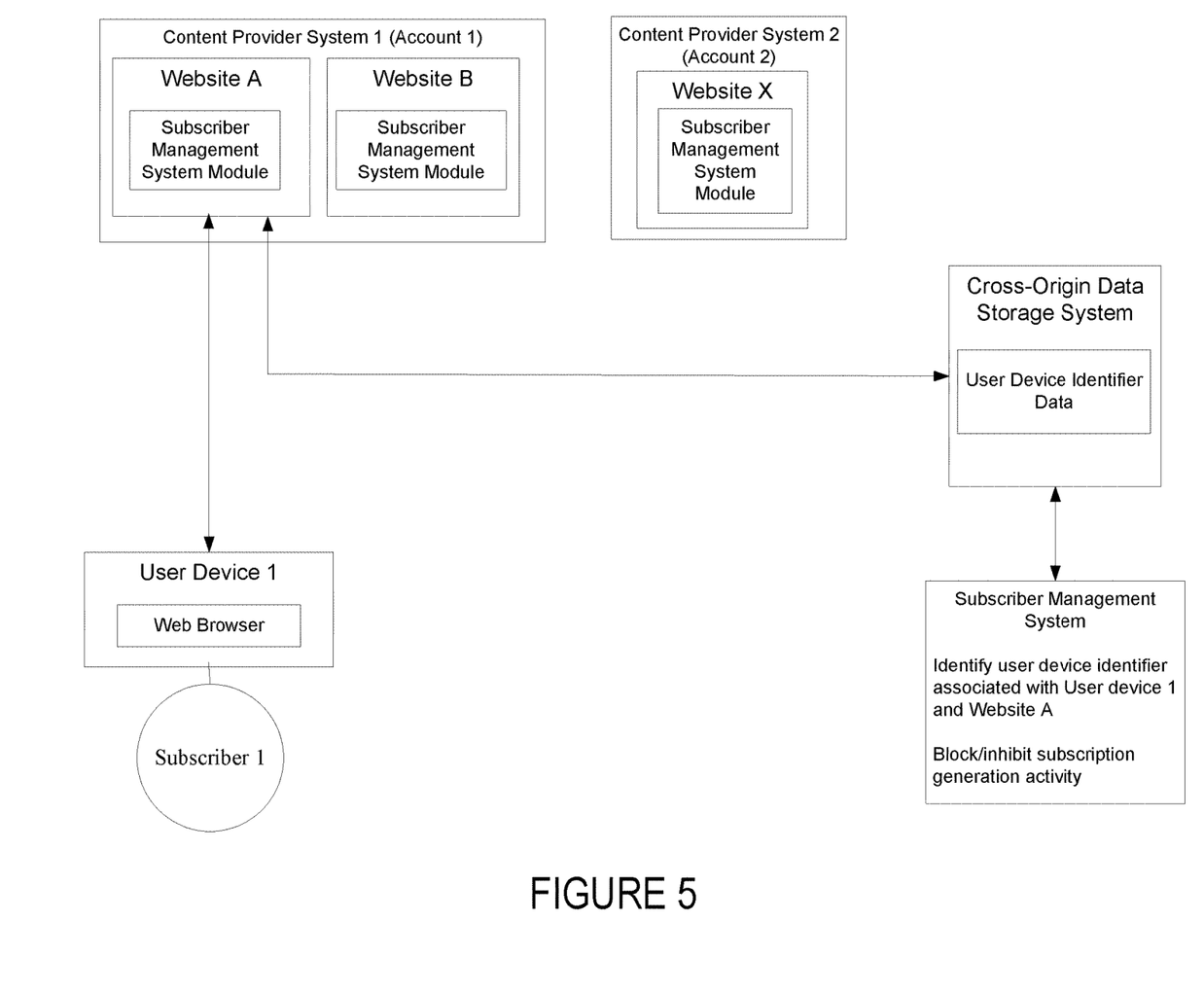
FIG. 5 illustrates example operations of a subscription management process executed by the subscriber management system including identifying a previous subscription associated with a user device and website associated with a content provider system, according to one or more embodiments of the present disclosure.

FIG. 5 illustrates example operations of a subscription management process executed by the subscriber management system, according to embodiments. As shown in FIG. 5, following the operations shown in FIG. 4, user device 1 visits Website A for a second or subsequent time following the subscription to website B in FIG. 4. In this embodiment, the subscriber management system module retrieves the previously stored subscription identifier (generated in FIG. 4) from one of the user device, the cross-origin data storage system, or storage of the subscription management system and prevents or inhibits the generation of a subscription prompt, in view of the previous subscription to a website within the same account (e.g., Website A and Website B are both part of Account 1 associated with Content Provider System 1). In an embodiment, a function (e.g., a "prevent-Duplication" function) is performed to prevent a new subscription associated with user device 1 and account 1 from being generated. In an embodiment, recognizing the prior subscription of user device 1 with Website B allows the subscriber management system to avoid generating a duplicate subscription of user device 1 with another website (e.g., Website A) associated with the same account (e.g., Account 1 associated with Content Provider System 1).

Figure 6:
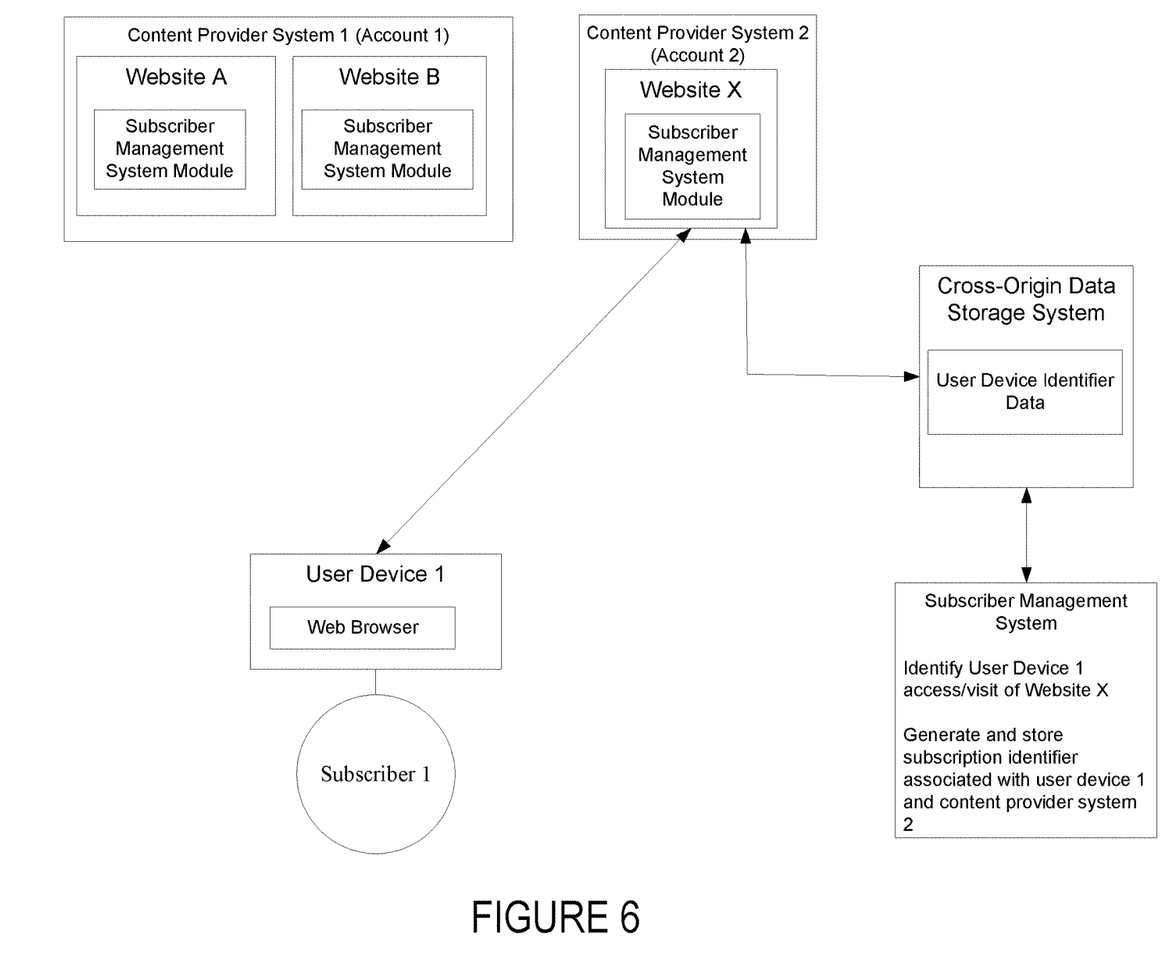
FIG. 6 illustrates example operations of a subscription management process executed by the subscriber management system including generating and storing a user device identifier in response to identifying access by a user device to a website associated with a content provider system, according to one or more embodiments of the present disclosure.

FIG. 6 illustrates example operations of a subscription management process executed by the subscriber management system, according to embodiments. As shown in FIG. 6, following the operations of FIG. 2, User Device 1 visits Website X which is owned or associated with content provider system 2 (account 2). In this embodiment, since Website X is owned by a different content provider system (e.g., is associated with a different account) than either website A or website B (owned by account 1), the subscriber management system generates and stores a user device identifier associated with User Device 1 and account 2. In this embodiment, the function (e.g., the "preventDuplication" function) described above in connection with FIG. 6 is disabled, thereby allowing a new user device identifier to be generated and stored. In an embodiment, in response to the identification of user device 1 visiting or accessing Website X, a check or look-up operation of the cross-origin data storage system by the subscriber management system of website X is performed. In this example, the check results in the determination that no user device identifier associated with User Device 1 and Website X is identified. In an embodiment, in response to this determination, a new user device identifier which associates User Device 1 with Website X of Content Provider System 1 is generated and stored in the cross-origin data storage system.

Figure 7:
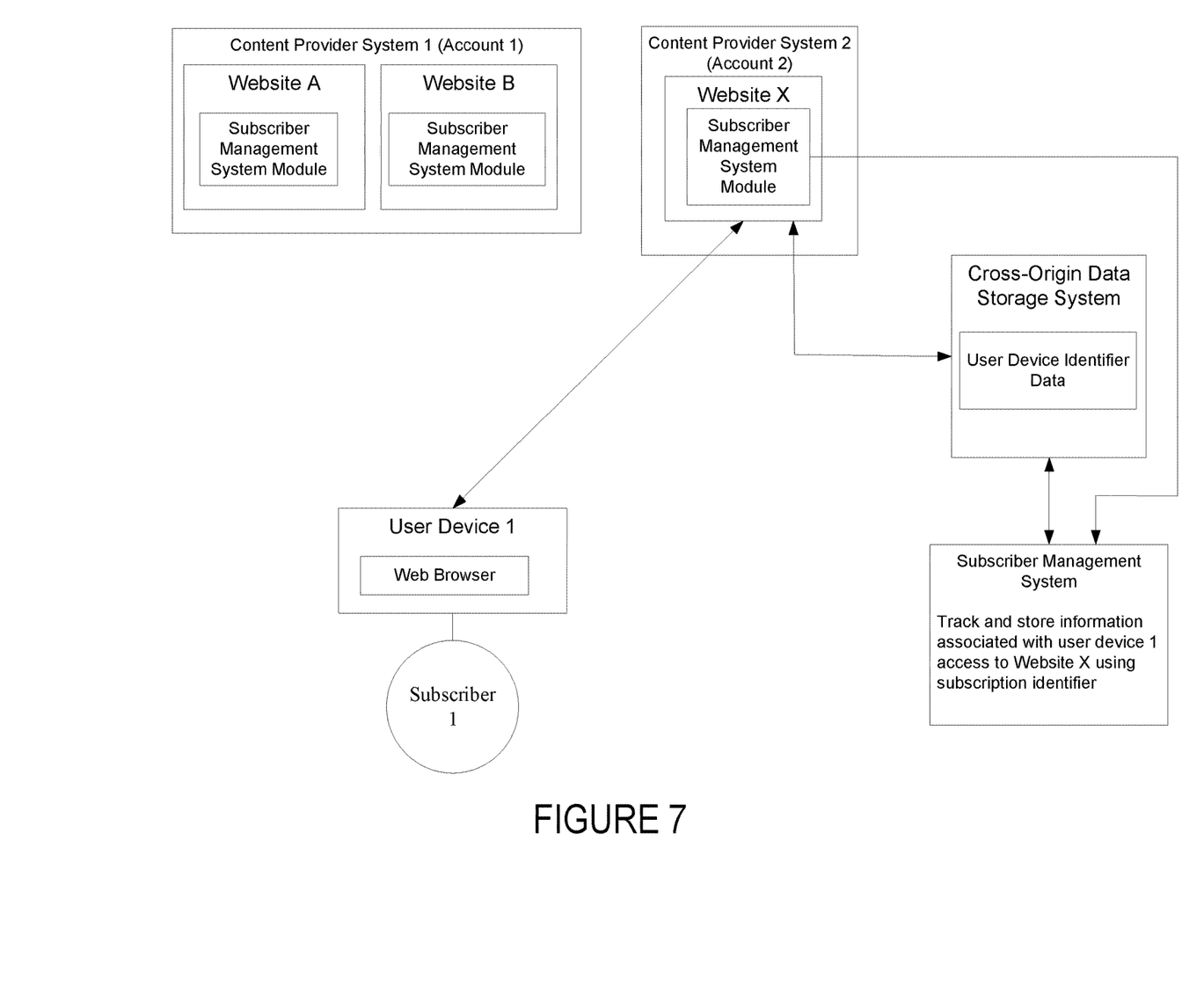
FIG. 7 illustrates example operations of a subscription management process executed by the subscriber management system including tracking web-based activity of a user device in view of a user device identifier, according to one or more embodiments of the present disclosure.

FIG. 7 illustrates example operations of a subscription management process executed by the subscriber management system, according to embodiments. As shown in FIG. 7, following the operations of FIG. 6, the subscriber management system tracks or identifies a subsequent visit by User Device 1 to Website X. Advantageously, following the generation of the user device identifier (e.g., in FIG. 6), any and all subsequent visits by User Device 1 to Website X can be identified and tracked. In an embodiment, in response to the access to Website X by User Device 1, the subscriber management system module accesses the cross-origin data storage system to determine if a user device identifier has been generated with respect to User Device 1 and account 2 (e.g., content provider system 2). Upon identifying the previously generated and stored user device identifier, the subscriber management system associates the recognized user device identifier with the subsequent visit and other web-based activities of User Device 1 to website X for tracking purposes.

Advantageously, in an embodiment, the user device identifier is stored and accessed in storage on the user device and passed in network requests when visiting a website with the subscription management system module installation. This contrasts with a cookie-based approach which stores the cookie on the website server-side (e.g., in the form of a server session). Beneficially, using cross-origin storage avoids common issues with cookie-based approaches such as data leakage and Cross-Site Request Forgery (CSRF). In addition, using the underlying web browser localStorage API allows storage of more data (e.g., 5 Mb) as compared to the conventional size of a cookie (e.g., 4 Kb).

In an example, as shown in FIG. 7, a cross-origin storage connection is established between the "client" (web browser of user device 1) and "hub" (cross-origin data storage system) to determine whether a subscription was previously created by this user device on the account (Account 2). Unlike a cookie-based approach, no information is retrieved from the API/Server related to the previous session for websites from Account 1 (e.g., as shown in FIGS. 2-5). Advantageously, the cross-origin data storage system only facilitates the access of data stored on the user device, rather than an external API/server.

In another embodiment, the subscriber management system module detects a set of idempotent functions invoked by a web browser of a user device. The set of functions is used to generate an output or identifier specific to the user device's web browser state and/or configuration. Example functions include, but are not limited to, static details provided by the browser such as the useragent information, whether localStorage is enabled, rendering images using Canvas and WebGL which add more variation between devices depending on browser capabilities (e.g., available fonts), etc. In an embodiment, the subscriber management system generates a final unique value based on the combination of the output of the functions identified in the collection phase. In an embodiment, the unique identifier is generated by concatenating the output of these functions and providing the concatenated outputs as an input to a one-way hashing function. In an embodiment, the website provides the unique value described in the previous step along with subscriber registration details to the backend for registration with the subscriber management system. Advantageously, the functions executed on the user device are idempotent, such that the same results are produced by the web browser throughout the session as well as across multiple sessions on different websites. In addition, the final unique identifier value combines with subscriber registration to produce a unique identifier for the subscription.

In an example implementation, an account owning a set of ten websites can opt not to subscribe a subscriber more than once and use the subscription management system to dedupe and not display an "opt-in" or subscription prompt if a previous subscriptions is identified. In an example implementation, the subscription management system can determine a best or optimal time to deliver a notification to a subscriber based on the next time the subscriber is detected online by one or more of the websites executing the subscription management system module.

In an example implementation, the subscription management system can implement a machine learning algorithm to generate analytics data associated with subscribers, such as, for example, time of activity, a level of active, a vertical interest level, etc.

Figure 8:
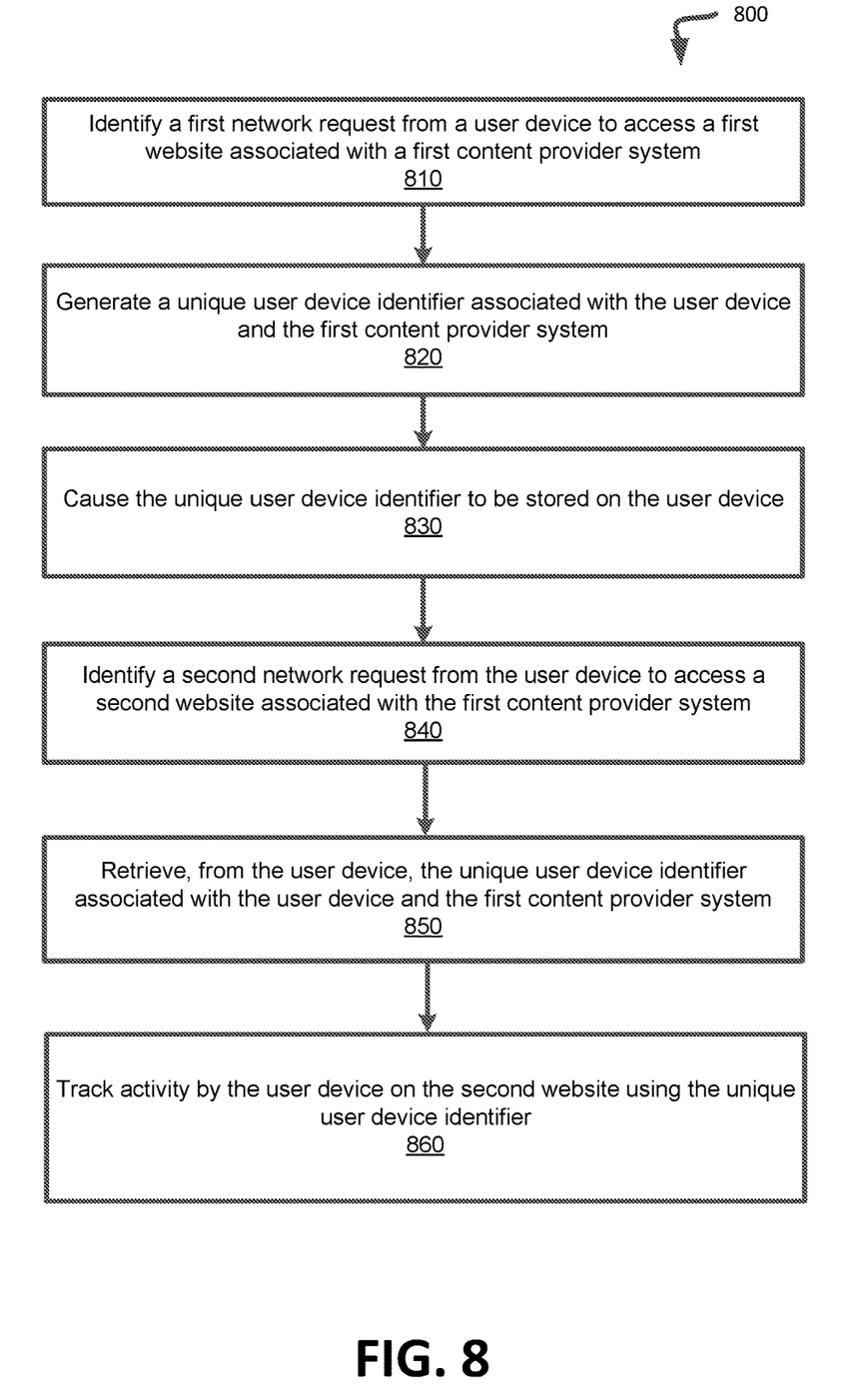
FIG. 8 is a is a flow diagram of an example method of managing tracking of web-based activity associated with a user device, according to one or more embodiments of the present disclosure.

FIG. 8 is a flow diagram of an example method of tracking web-based activity of a user device with respect to one or more websites associated with one or more content provider systems in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by subscriber management system 100 and the subscriber management module 105 of FIGS. 1-7. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic identifies a first network request from a user device to access a first website associated with a first content provider system. In an embodiment, the first network request can include the establishing of a web-based communication link between a web browser of the user device and a link or URL associated with the first website. In an embodiment, the first website is associated with an executable subscriber management module of a subscriber management system, according to embodiments of the present disclosure. In an embodiment, the subscriber management system module can be installed, embedded, or otherwise executable via the first website to identify the first network request by the first user device.

At operation 820, the processing logic generates a unique user device identifier associated with the user device and the first content provider system. In an embodiment, the unique user device identifier is generated in response to a determination that there is no previously generated and stored unique user device identifier corresponding to the association between the first user device and first content provider system. In an embodiment, in response to identifying the first network request from the first user device to access the first website, the processing logic can determine whether a record, file or other storable object corresponding to the unique user device identifier for the first user device-first content provider system relationship or association is stored on the user device. If no such unique user device identifier is stored on the user device or provided via the first network request, the processing logic generates the unique user device identifier in operation 820. In an embodiment, the unique user device identifier represents the link or relationship between a user device (e.g., the first user device) and a content provider system (e.g., the first content provider system) and can be used to track web-based activity of the user device with respect to the one or more websites associated with the content provider system.

At operation 830, the processing logic causes the unique user device identifier to be stored on the user device. According to embodiments, the unique user device identifier is also stored in the cross-origin data storage system (e.g., the cross-origin data storage system 120 of FIG. 1) and storage of the subscription management subscriber management system 100 along with related subscriber registration details. In an embodiment, the multiple different content provider systems (e.g., content provider systems 1, content provider system 2 . . . content provider system N of FIG. 1) are each associated with one or more websites. In an embodiment, a content provider system can own, control, or manage a number of different websites which are all associated with the content provider system. For example, as shown in FIGS. 2-7, content provider system 1 (Account 1) is associated with Website A and Website B. In an embodiment, in response to generating the unique user device identifier associated with the first user device and the first content provider systems, the unique user device identifier is stored on the user device. In an embodiment, the unique user device identifier may also be stored in the data store (e.g., the cross-origin data storage system), which is accessible by multiple different content provider systems and multiple different websites associated with those content provider systems. In an embodiment, each subscriber management system module executable by a website of a content provider system can communicatively connect with and access data (e.g., the unique user device identifiers and corresponding tracking information) stored on the user device and in the data store.

At operation 840, the processing logic identifies a second network request from the user device to access a second website associated with the first content provider system. In an embodiment, the second website (e.g., Website B of FIGS. 2-7) includes a subscriber management system module configured to detect or identify the network request from the user device for access to the second website.

At operation 850, the processing logic retrieves, from the user device, the unique user device identifier associated with the user device and the first content provider system. In an embodiment, the subscriber management system module of the second website identifies and retrieves the unique user device identifier from the user device (e.g., from storage of the user device or from the second network request). Since the second website is associated with the first content provider system, the unique user device identifier (which represents a relationship between the user device and the first content provider system) can be used to track activity relating to the second website.

At operation 860, the processing logic tracks activity by the user device on the second website using the unique user device identifier. In an embodiment, the tracking of the activity can include identifying, monitoring, and storing a record associated with the activity by the user device with respect to the second website. In an embodiment, the web-based activity can be tracked and stored in association with the unique user device identifier in the data store (e.g., the cross-origin data storage system of FIGS. 1-7).

In an embodiment, a user of the user device can engage in subscription processing via a website to subscribe to that website. In an embodiment, the subscription can include the provisioning of subscription or registration information by the user of the user device (e.g., a username, password, address, etc.) or a consent to the subscription provided via an opt-in prompt. In an embodiment, information associated with the subscription can be stored on the user device and in the data store and used to track activity associated with the user. In an embodiment, if a user subscribes to a first website associated with a content provider system (e.g., Website B associated with content provider system 1 in FIG. 4), then the subscriber management system module of a related website (e.g., Website A) associated with the same content provider system can be configured to detect the subscription information and block the generation of a further subscription prompt or related communication.

Figure 9:
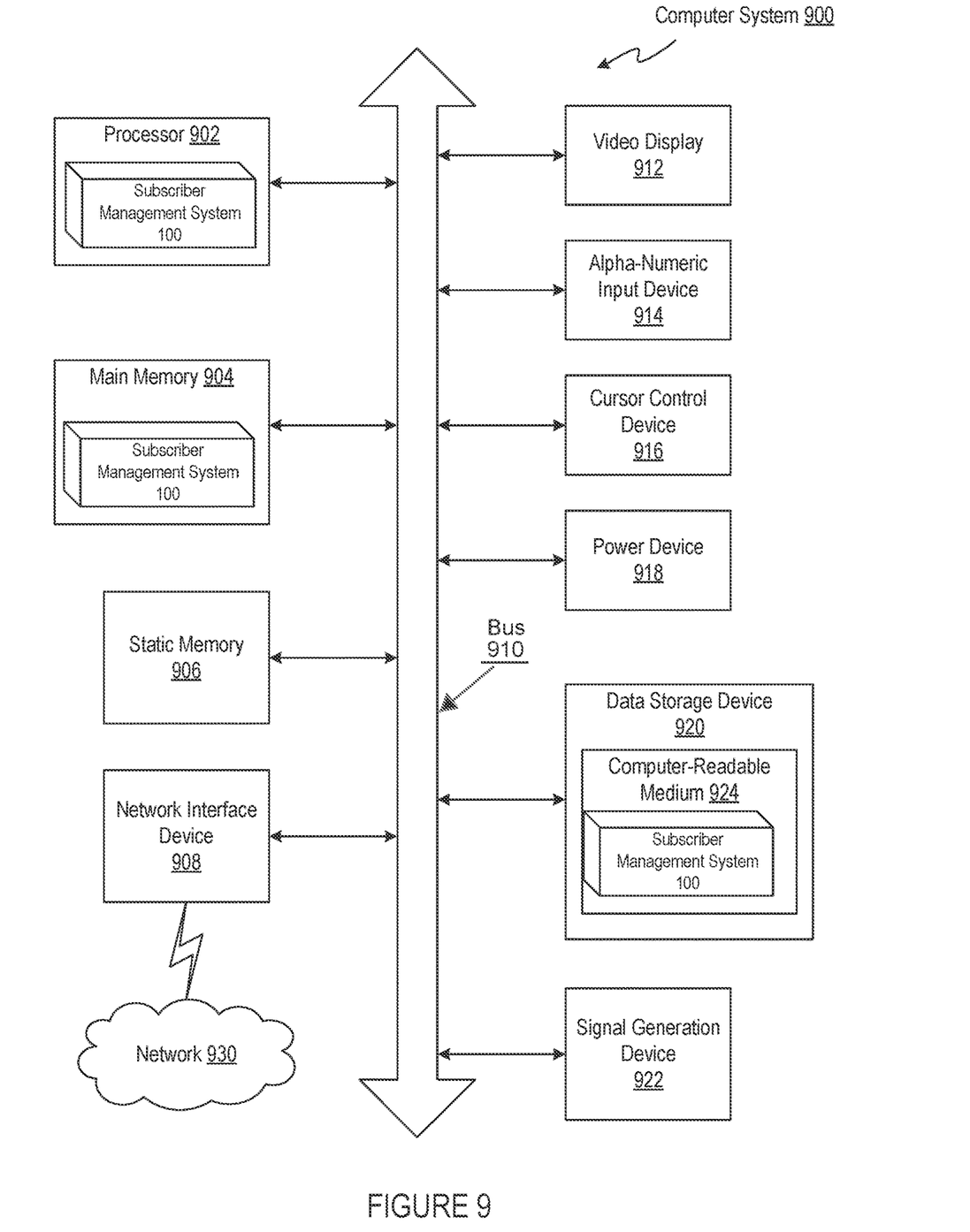
FIG. 9 is a block diagram of an example computer system that may perform one or more of the operations described herein, in accordance with one or more embodiments of the present disclosure.

FIG. 9 is a block diagram of an example computer system 900 that may perform one or more of the operations described herein, in accordance with various implementations. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device (e.g., a processor) 902, a main memory 904 (e.g., read-only memory (ROM), flash memory, dynamic random access memory (DRAM) such as synchronous DRAM (SDRAM), double data rate (DDR SDRAM), or DRAM (RDRAM), etc.), a static memory 906 (e.g., flash memory, static random access memory (SRAM), etc.), and a data storage device 914, which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions for performing the operations and steps discussed herein.

The computer system 900 may further include a network interface device 908. The computer system 900 also may include a video display unit 912 (e.g., a liquid crystal display (LCD) or a cathode ray tube (CRT)), an alphanumeric input device 914 (e.g., a keyboard), a cursor control device 916 (e.g., a mouse), and a signal generation device 922 (e.g., a speaker).

The data storage device 920 may include a computer-readable storage medium 924 on which is stored one or more sets of instructions (e.g., software) embodying any one or more of the methodologies or functions described herein. The instructions may also reside, completely or at least partially, within the main memory 904 and/or within the processor 902 during execution thereof by the computer system 900, the main memory 904 and the processor 902 also constituting computer-readable storage media. The instructions may further be transmitted or received over a network 930 via the network interface device 908.

In one implementation, the instructions are executable to perform operations and functions associated with the subscriber management system 100 and subscriber management system module 105 in FIG. 1 and/or a software library containing methods that call the subscriber management system 100 and subscriber management system module 105 of FIG. 1. While the computer-readable storage medium 924 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "establishing", "generating", "determining", "searching" "identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

The terms "first", "second", "third", "fourth", etc. as used herein are meant as labels to distinguish among different elements and may not necessarily have an ordinal meaning according to their numerical designation. The term "set" can refer to one or more elements, items, components, values, members, parts, etc.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
identifying a first network request from a first user device to access a first website associated with a first content provider system administering the first website;
generating, by a program executable by a processing device, a first unique user device identifier associated with the first user device and the first content provider system, the first unique user device identifier identifying an association of the first user device and first content provider system;
causing the first unique user device identifier to be stored on the first user device;
identifying a second network request from the first user device to access a second website associated with the first content provider system, wherein the first content provider system administers the second website;
in response to a determination that the second website is associated with the first content provider system, retrieving, from the first user device, the first unique user device identifier associated with the first user device and the first content provider system;
tracking activity by the first user device on the second website using the first unique user device identifier;
establishing, by the first website, a subscription of a user associated with a second user device in view of a subscription prompt displayed via the first website;
generating a first subscription identifier associated with the subscription;
causing the first subscription identifier to be stored on the second user device;
identifying a third network request from the second user device to the second website associated with the first content provider system;
retrieving, from a data store, the first subscription identifier; and
blocking generation of the subscription prompt to the second user device via the second website.

2. The method of claim 1, further comprising:
identifying a fourth network request from the first user device to access a third website associated with a second content provider system;
generating a second unique user device identifier associated with the first user device and the second content provider system; and
causing the second unique user device identifier to be stored on the first user device.

3. The method of claim 1, further comprising installing the program on the first website.

4. The method of claim 1, further comprising causing information associated with the activity by the first user device on the second website to be stored in the data store, wherein the data store comprises a cross-origin data storage system accessible by a plurality of content provider systems.

5. The method of claim 1, wherein the second network request comprises the first unique user device identifier.

6. The method of claim 1, further comprising receiving, by the first website, consent from the user to the subscription via the subscription prompt.

7. The method of claim 1, wherein the first subscription identifier comprises registration details and a second unique user device identifier associated with the second user device and the first content provider system.

8. A system comprising:
one or more memory devices to store instructions; and
one or more processing devices, operatively coupled to at least a portion of the one or more memory devices, the one or more processing devices to execute the instructions to perform operations comprising:
identifying a first network request from a first user device to access a first website associated with a first content provider system administering the first website;
generating, by a program executable by a processing device, a first unique user device identifier associated with the first user device and the first content provider system, the first unique user device identifier identifying an association of the first user device and first content provider system;
causing the first unique user device identifier to be stored on the first user device;
identifying a second network request from the first user device to access a second website associated with the first content provider system, wherein the first content provider system administers the second website;
in response to a determination that the second website is associated with the first content provider system, retrieving, from the first user device, the first unique user device identifier associated with the first user device and the first content provider system;
tracking activity by the first user device on the second website using the first unique user device identifier;
establishing, by the first website, a subscription of a user associated with a second user device in view of a subscription prompt displayed via the first website;
generating a first subscription identifier associated with the subscription; and
causing the first subscription identifier to be stored on the second user device;
identifying a third network request from the second user device to the second website associated with the first content provider system;
retrieving, from a data store, the first subscription identifier; and
blocking generation of the subscription prompt to the second user device via the second website.

9. The system of claim 8, the operations further comprising:
identifying a fourth network request from the first user device to access a third website associated with a second content provider system;
generating a second unique user device identifier associated with the first user device and the second content provider system; and
causing the second unique user device identifier to be stored on the first user device.

10. The system of claim method of claim 8, the operations further comprising causing information associated with the activity by the first user device on the second website to be stored in the data store, wherein the data store comprises a cross-origin data storage system accessible by a plurality of content provider systems.

11. The system of claim 8, wherein the second network request comprises the first unique user device identifier.

12. The system of claim 8, further comprising receiving, by the first website, consent from the user to the subscription via the subscription prompt.

13. The system of claim 8, wherein the first subscription identifier comprises registration details and a second unique user device identifier associated with the second user device and the first content provider system.

14. A non-transitory computer readable storage medium having instructions that, when executed by a processing device, cause the processing device to perform operations comprising:
    identifying a first network request from a first user device to access a first website associated with a first content provider system administering the first website;
    generating, by a program executable by a processing device, a first unique user device identifier associated with the first user device and the first content provider system, the first unique user device identifier identifying an association of the first user device and first content provider system;
    causing the first unique user device identifier to be stored on the user first device;
    identifying a second network request from the first user device to access a second website associated with the first content provider system, wherein the first content provider system administers the second website;
    in response to a determination that the second website is associated with the first content provider system, retrieving, from the first user device, the first unique user device identifier associated with the first user device and the first content provider system;
    tracking activity by the first user device on the second website using the first unique user device identifier;
    establishing, by the first website, a subscription of a user associated with a second user device in view of a subscription prompt displayed via the first website;
    generating a first subscription identifier associated with the subscription; and
    causing the first subscription identifier to be stored on the second user device; operations further comprising:
    identifying a third network request from the second user device to the second website associated with the first content provider system;
    retrieving, from a data store, the first subscription identifier; and
    blocking generation of the subscription prompt to the second user device via the second website.

15. The non-transitory computer-readable storage medium for claim 14, the operations further comprising:
    identifying a fourth network request from the first user device to access a third website associated with a second content provider system;
    generating a second unique user device identifier associated with the first user device and the second content provider system; and
    causing the second unique user device identifier to be stored on the first user device.

16. The non-transitory computer-readable storage medium of claim 14, the operations further comprising installing the program on the first website.

17. The non-transitory computer-readable storage medium of claim 14, further comprising causing information associated with the activity by the first user device on the second website to be stored in the data store, wherein the data store comprises a cross-origin data storage system accessible by a plurality of content provider systems.

18. The non-transitory computer-readable storage medium of claim 14, wherein the second network request comprises the first unique user device identifier.

19. The non-transitory computer-readable storage medium of claim 14, the operations further comprising receiving consent from the user to the subscription via the subscription prompt.

20. The non-transitory computer-readable storage medium of claim 14, wherein the first subscription identifier comprises registration details and a second unique user device identifier associated with the second user device and the first content provider system.

* * * * *